United States Patent
Wang et al.

(10) Patent No.: US 7,753,002 B2
(45) Date of Patent: Jul. 13, 2010

(54) ANIMAL LITTER, PROCESS FOR PREPARING ANIMAL LITTER, AND METHOD FOR REMOVAL OF ANIMAL WASTE

(75) Inventors: Lin Wang, Iowa City, IA (US); Thomas A. Wiesner, Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 658 days.

(21) Appl. No.: 11/615,206

(22) Filed: Dec. 22, 2006

(65) Prior Publication Data

US 2007/0101941 A1 May 10, 2007

Related U.S. Application Data

(63) Continuation of application No. 10/300,205, filed on Nov. 20, 2002, now abandoned.

(60) Provisional application No. 60/401,510, filed on Aug. 7, 2002, provisional application No. 60/332,039, filed on Nov. 21, 2001.

(51) Int. Cl.
*A01K 29/00* (2006.01)
(52) U.S. Cl. ................................................ 119/171
(58) Field of Classification Search ......... 119/171–173, 119/51.01; 424/76.6; 502/400, 401; 426/618, 426/623, 635
See application file for complete search history.

(56) References Cited

U.S. PATENT DOCUMENTS

| 3,124,459 | A | * | 3/1964 | Erwin | 424/76.1 |
| 4,883,021 | A | * | 11/1989 | Ducharme et al. | 119/171 |
| 5,526,770 | A | * | 6/1996 | Kiebke | 119/171 |
| 6,089,189 | A | * | 7/2000 | Goss et al. | 119/173 |
| 6,098,569 | A | * | 8/2000 | Kent et al. | 119/171 |
| 2002/0028283 | A1 | * | 3/2002 | Freeman | 426/635 |
| 2003/0113430 | A1 | * | 6/2003 | Ethington, Jr. | 426/635 |
| 2003/0131799 | A1 | * | 7/2003 | Wong et al. | 119/171 |

FOREIGN PATENT DOCUMENTS

| JP | 60094042 | 5/1985 |
| JP | 10-271931 | 10/1988 |

* cited by examiner

*Primary Examiner*—Son T. Nguyen
(74) *Attorney, Agent, or Firm*—Fitch, Even, Tabin & Flannery

(57) ABSTRACT

Disclosed are animal litters, processes for preparing animal litters, and methods for removal of animal waste. The disclosed litters are made from ingredients including plant meal, grain germ, citrus residue, and grain bran, usually in combination with a cohesiveness agent and a microbial inhibitor. The litters are provided in the form of discrete plural articles which tend to agglomerate when wetted.

12 Claims, No Drawings

ANIMAL LITTER, PROCESS FOR PREPARING ANIMAL LITTER, AND METHOD FOR REMOVAL OF ANIMAL WASTE

CROSS-REFERENCE TO RELATED PATENT APPLICATIONS

This application claims priority to two prior U.S. Provisional applications, U.S. Provisional Patent Application Ser. Nos. 60/401,510, filed Aug. 7, 2002, and 60/332,039, filed Nov. 21, 2001. Both prior applications are hereby incorporated by reference in their entireties.

FIELD OF THE INVENTION

This invention pertains to animal litter. In particularly preferred embodiments, the invention provides a litter for household cats.

BACKGROUND OF THE INVENTION

Clumping animal litters are typically provided in the form of discrete plural particles. The particles tend to agglomerate into solid masses or clumps when wetted by a liquid waste such as animal urine. A number of such clumping litters are known. One advantage of such clumping litters is that the solid clumps, which are formed upon wetting of the litter, can be separately removed as discrete entities from the remaining litter. The clumped litter can be discarded by the animal owner, leaving behind a quantity of relatively uncontaminated litter for future use. Animal owners, particularly owners of house cats, often find the clumping property of such litters to be convenient for periodic cleaning of the animal litter box. Ammonia-masking properties also are desirable in animal litters because ammonia, a breakdown product of the urea found in animal urine, is a significant factor that contributes to the undesirable odor of animal waste. Some known animal litters have good ammonia-masking properties.

Many clumping animal litters are made from clays and other mineral substrates. Such litters typically include particles of a mineral substrate, which substrate functions as an absorbent and/or odor reducer. The particles may be coated with a liquid-activated adhesive material, such as gelatinized starch, on the surfaces of the particles. When wetted, the adhesive material is activated and causes the discrete litter particles to agglomerate into clumps.

Although clay-based litters may be functional as clumping animal litters, such litters suffer from certain drawbacks. For example, one disadvantage of clay litters is the high density of the clay component of the litter. Because of this high density, a relatively heavy mass of litter must be used for a given volume of urine. In addition, the resulting clumps of soiled litter are somewhat heavy, and thus can fracture in the absence of strong interparticle adhesion. Another disadvantage of clay litters is that, because the clay is not biodegradable, the litter cannot be flushed into some sewage systems after use. This may be inconvenient for certain animal owners.

In recognition of these drawbacks, animal litters made from biodegradable materials, such as seed hulls or other grain-based materials, have been provided. Such litters are often suitable for disposal by flushing into sewage systems. For instance, U.S. Pat. No. 6,014,947 purports to disclose a grain-based litter made from whole wheat or other ground grains. In recognition of the advantages inherent in clumping animal litters, biodegradable litters that exhibit a clumping property have undergone development. Like typical clumping clay litters, such litters often comprise discrete particles of a liquid-absorbent substrate having a liquid-activated adhesive coated thereon.

Many known grain-based litters, however, also suffer from drawbacks. For example, soiled clumps of such grain-based litters typically are more friable than clumps of clay-based litters. Moreover, while grain-based clumping litters may initially form cohesive clumps, the long-term cohesiveness of the formed clumps may be poor. Thus, while a solid clump may be formed and remain solid for a short period of time, the clump may tend to disintegrate with time or on handling, making it difficult to separate the soiled clumped litter from the unspoiled litter.

Another problem with both clay-based and grain-based clumping litters relates to clumping efficiency, or the amount of litter required to form a clump. Large amounts of conventional litters are required to form a clump, and thus conventional clumping litters are used up quickly. The animal owner thus is forced to replenish the supply of litter frequently.

Numerous litters and sorbents have been provided in the art, and many of these are based on citrus products. U.S. Pat. Nos. 4,386,580; 4,424,263; and 4,446,019, for instance, disclose the use of dry citrus pulps in an animal litter. U.S. Pat. Nos. 4,737,582 and 4,883,021 purportedly disclose pectin-containing absorbent materials. Other patents that purport to describe asborbents based on citrus products include U.S. Pat. Nos. 5,188,064 and 5,361,219. Another reference, U.S. Pat. No. 4,222,824, discloses cyclodextrin and cellulose in animal litter. For various reasons, the products purportedly disclosed in the foregoing patents are believed to be unsatisfactory.

In light of the drawbacks inherent in known clay-based and grain-based animal litters, there exists a need for a more satisfactory biodegradable clumpable animal litter. Ideally, the litter should be made from a renewable, biodegradable resource, such as a grain-based substrate. The litter also should possess acceptable clumping properties, such as low clump mass, initial cohesiveness of the clumps, and long-term cohesiveness of the clumps.

Grain-based litters with improved clumping properties have been developed and such litters are taught in U.S. Pat. Nos. 6,089,569 and 6,216,634 (both to Kent et al., assignors to Grain Processing Corporation of Muscatine, Iowa). These litters have many excellent properties. It is a general object of this invention to provide additional animal litters that are formulated with grains and other biodegradable materials.

THE INVENTION

The invention provides a number of litters that in preferred embodiments have properties that are equal or superior to the litters disclosed in U.S. Pat. Nos. 6,089,569 and 6,216,634. The animal litters of the invention are formulated from various naturally derived substrates (although it is contemplated that non-natural ingredients may also be included). The litters are provided in the form of discrete plural compacted particles, such as pellets, which tend to agglomerate when wetted. Preferably, the particles are pellets prepared by pelletizing the various components of the animal litter in a pellet mill. In some embodiments, the particles are provided in the form of pellets that have been reduced in size, such as by crumbling the pellets.

In one embodiment, the litter includes a first sorbent, which may be selected from the group consisting of a plant meal, grain germ, and mixtures thereof, and a discrete second sorbent, which may be selected from the group consisting of a grain bran, a citrus residue (which may be a pulp or peel residue) and mixtures thereof. The plant meal preferably is a grain meal. The second sorbent preferably is a fibrous sorbent, which is present in the litter in an amount effective to enhance agglomeration of the discrete plural particles of the litter. Preferably, the litter includes a cohesiveness agent, which may be present in an amount effective to enhance the intraparticle cohesion of the particles.

In another embodiment the animal litter includes a mixture of at least two discrete sorbents selected from the group consisting of a plant meal, grain germ, citrus residue, and mixtures thereof, and a cohesiveness agent present in an amount effective to enhance the intraparticle cohesion of the particles.

In yet another embodiment, the litter includes a citrus residue sorbent, preferably in conjunction with a cohesiveness agent, the cohesiveness agent being present in an amount effective to enhance the intraparticle cohesion of the particles.

The invention further comprises methods for preparing an animal litter. Generally, the method includes the step of compacting the ingredients of an animal litter into discrete plural particles which tend to agglomerate when wetted. Preferably, the compacting is performed by pelletizing the ingredients in a pellet mill; if desired, the pellets yielded from the pellet mill may be reduced in size.

Also encompassed by the invention are methods for removal of animal waste. A container including a litter of the invention is provided, and an animal is allowed to excrete waste into the litter, whereby liquid present in the waste causes agglomeration of at least some of the litter into at least one clump. The clump is then removed from the container. The litter is useful in conjunction with removal of waste from house cats, and also in conjunction with removal of waste from other animals, such as other mammals (e.g. rodents) and birds.

DESCRIPTION OF THE PREFERRED EMBODIMENTS

The inventors have identified a range of desired properties for clumping animal litter, these including biodegradability, high sorption capacity, cohesion, clumpablility, ammonia and other odor masking, a density and texture that is acceptable for the target animal, clump strength, tendency to remain clumped, clump weight, and cost. In general, the various ingredients and processing conditions may be selected to accommodate a desired combination of properties. Some combinations of ingredients and processing conditions may not yield a litter that is satisfactory. Selection of appropriate ingredients and processing conditions will become apparent upon review of the following description.

The animal litter of the invention is in the form of discrete plural particles, which particles generally are sufficiently cohesive for use as an animal litter. By "particles" is contemplated granules or pellets obtained by compaction. The compaction may be any process suitable for compressing the ingredients from which the litter is composed to an extent that the internal cohesion of the ingredients is increased. Generally, the mass of ingredients should become sufficiently internally cohesive for use as an animal litter (sometimes a subsequent drying step will be necessary). The preferred method of compaction is by pelletizing the mixtures of ingredients in a pellet mill, but other processes (such as extrusion) may be employed. Generally, the pellets formed in a pellet mill (or the extrudate formed upon extruding the litter components) should be subjected to a process such as crumbling, to reduce the size of the pellets (or extrudate).

The invention contemplates the preparation of animal litters from ingredients such as whole ground grain, or grain meal. By "plant meal" is meant to include meals or flours from grain, beans, grass, and the like, which are typically thought of as agriculturally derived meals or flours. Any plant meal that may be formulated into a clumping litter in accordance with the teachings herein may be deemed suitable for use in conjunction with the invention. The plant meal preferably is a grain meal, i.e., a ground grain, and preferably is a ground whole grain. In some embodiments, ground fines can be removed from a whole grain meal, such as by screening. The remaining ground product is still considered to be a whole grain meal within the meaning of the invention. Suitable plant meals include, for example, corn meal, soy meal, sorghum meal, alfalfa meal, barley meal, and the like. Combinations of two or more of the foregoing may be used. Preferably, the grain meal used in the animal litter of the invention includes a grain meal derived from an oil-rich grain. Most preferably, the grain meal is derived from corn grain.

For practical considerations, the grain meal preferably consists of a whole unprocessed grain meal, though a processed grain meal or a combination of a whole grain meal and a processed grain meal may also be used in the inventive animal litter. By "whole grain meal" is meant to include a milled whole grain, such as grain meal that is produced in a wet or dry milling process. Processed grain meal includes, for example, meal or flour from which the germ or bran has been removed. In one preferred embodiment, the grain meal used in the animal litter of the present invention includes whole corn meal or a combination of whole corn meal and processed corn meal, such as defatted corn meal obtained from a solvent extraction or press extraction process.

The plant meal preferably is present in the animal litter of the invention in an amount of from about 10% to about 90% based on the overall weight of the animal litter. More preferably, the plant meal is present in the litter in amount of from about 20% to about 80% by weight of the animal litter, even more preferably from about 30% to about 70% by weight of the animal litter, and most preferably from about 50% to about 70% by weight of the animal litter, e.g., about 66% by weight of the animal litter.

The invention further contemplates the incorporation of a grain germ into the litter in certain embodiments. Generally, corn germ is the oil-rich portion of the corn kernel. The corn germ constitutes roughly 10-14% of the weight of the kernel, and contains about 49% oil/fat based on the weight of the germ. Other components of corn germ include starch (about 8% by weight), protein (about 12% by weight), ash (about 2% by weight), moisture (about 8% by weight) and crude fiber (about 5% by weight). In commercial grain milling, grain germ often is extracted (e.g., by solvent or press extraction) to provide a rich source of grain oil, which results in "spent" germ, as set forth in more detail in the aforementioned U.S. Pat. No. 6,098,569. Unspent or "virgin" grain germ is grain germ that has not been oil-extracted, and is typically obtained directly by wet or dry milling whole grain. The grain germ may be selected from among the known grain germs, but preferably is corn germ. The preferred form of germ useful in conjunction with the invention is unwashed, spent corn germ obtained via dry milling.

Without being bound by any particular theory, it is believed that grain germ provides multiple functions in the animal litter composition. Virgin germ, when used as a starting material, will add lubricating oil to the mixture of starting materials (the germ will become at least partially expended during the course of processing the ingredients). In addition, the grain germ (whether added as virgin or spent grain germ) can improve the clumping properties of the animal litter of the invention. For example, the addition of a germ in an effective amount can improve clumping properties such as by reducing the clump weight and/or by increasing clump strength of the animal litter of the invention when the litter is wetted. The reduction in clump weight is advantageous in that less litter is required to form a clump with an amount of urine relative to litters that result in a higher clump weight with the same amount of litter. A lower clump weight can also result in a cost savings for the consumer.

When a virgin grain germ is used in accordance with the invention, it is preferably present in an amount of at least about 1% to at most about 20% based on the overall weight of the animal litter. More preferably, the virgin grain germ is present in the animal litter of the invention in an amount of from about 2% to about 10% by weight of the animal litter. Still more preferably, the virgin grain germ is present in the animal litter of the invention in an amount of from about 3% to about 8% by weight of the animal litter. Most preferably, the virgin grain germ is present in the animal litter of the invention in an amount of from about 3% to about 5% by weight of the animal litter. For instance, the germ may be present in an amount of 3%, 4%, 5%, or any other amount.

In some embodiments, the litter includes a plant fiber that is effective in enhancing the agglomeration of the particles of litter when wetted. The fiber should be present in at least an amount effective to enhance the agglomeration of the particles of animal litter when the particles are contacted with a liquid such as animal urine. Without being bound by any particular theory, it is contemplated that the fiber provides for an enhancement of clump strength, or an increase in clump cohesiveness, and in many embodiments, an increase in both clump strength and cohesiveness. The enhancement in particle agglomeration, with respect both to clump strength and cohesiveness, is believed to be due to enhancement of adhesion between the particles, which in turn is in some cases is believed to be due to hydrogen bonding phenomena. Clump strength is a measure of the force required to fracture a clump of animal litter, while cohesiveness is a measure of the friability of a clump. A high clump strength is advantageous in that it reduces the likelihood of breakage of the clumps, thereby allowing the soiled animal litter to be removed more effectively. High clump strength also minimizes the likelihood of leaving behind soiled animal litter that may break off upon removal of soiled clumps. Both clump strength and cohesiveness, but especially cohesiveness, may be qualitatively evaluated with the increase in these properties being evaluated relative to an animal litter that does not include the fiber. A method for evaluating cohesiveness and a quantitative method for evaluating clump strength are set forth herein in the Examples.

Any suitable plant fiber or combination of fibers may be used in conjunction with the invention. Exemplary plant fibers include grain bran and citrus residues. Preferred grain brans include, for example, wheat bran, corn bran, soy bran, sorghum bran, barley bran, or any combination thereof. Preferably, the grain bran includes a ground corn bran. In one embodiment of the invention, the grain bran is preferably present in an amount of from about 1% to about 90%, more preferably from about 3% to about 70%, even more preferably from about 4% to about 50%, and most preferably from about 5% to about 30% by weight of the animal litter. These amounts are exclusive of any bran present in the grain meal, with the proviso that the invention is not intended to encompass ground whole grain to which nothing has been added. If the invention is embodied in a product that comprises one or both of grain meal or grain germ in combination with a grain bran, the grain bran being a bran from the same grain from which the meal is derived, then in preferred embodiments the bran is present in the litter in an amount greater than that in which the bran would naturally be present in ground whole grain. Preferably, the bran is present in an amount of at least 5% more than would be present in the ground whole grain; more preferably, the bran is present in an amount of at least 10% more than would be so present. In some embodiments, a litter may comprise one or both of a grain meal or grain germ in combination with a grain bran, the grain bran being a bran from a different grain than the grain from which the meal or germ is derived. More generally, the germ, grain, and cohesiveness agent should be present as discrete ingredients, by which is contemplated that the various components of the litter do not comprise a whole ground grain, or constitute ingredients which when combined and ground are indistinguishable from whole ground grain (although whole ground grain may be a component of the animal litter).

In accordance with some preferred embodiments of the invention, the litter is formulated with a citrus residue, which may be a pulp residue and/or a peel residue. It is contemplated that in some embodiments of the invention the citrus pulp and/or peel residue may be used alone as an animal litter. Citrus residues are fibrous materials that have good sorption properties and excellent odor control properties. The residue may be the residue of any suitable citrus fruit. Citrus peel is the outside shell of the citrus, while pulp is the inside soft cell wall tissues of the citrus. Fresh peel and pulp can be processed into dry products by different processes. In accordance with one such process, the peel/pulp, equivalent to approximately 50% of the processed fruit's weight, will be converted into citrus pulp pellets, which are commercially used in cattle feed. Calcium oxide is added to the peels, which are then crushed into small bits ranging in size from 0.2 cm to 0.6 cm. These small pieces go through a reactor for approximately 12 minutes where the mixing of the calcium oxide to the wet peel liberates water. Moisture content of the peel is reduced from approximately 82% to 72% after the pressing. The wet peel then is dried in rotating cylindrical dryers where hot gas is generated from the combustion of fuel oil or natural gas. The peels leave the dryers at a temperature of approximately 140° C. and at a moisture content of 10% to 21%. The peels are pelletized and sold as "Citrus Pellets," or "Cattle Feed." The pellets have significant "burnt" or toasted" odor resulting from the process.

In a different process, the peels are further washed with water to remove juice residues, and then crushed into small pieces without addition of calcium oxide. The wet peels are then dried in a rotating dryer and dried to a moisture content of 10% to 12% or lower. The dry product is sold as "Orange Pectin Peel" or "Pectin Peel." Pectin peel generally has a clean light citrus aroma, without the "burnt" odor of the "Cattle Feed" pellets.

Both commercial pectin peel and citrus pellets (and similar citrus residues) are deemed to be particularly useful in conjunction with the invention. Pectin peel and citrus pellets both contain some pulp residue and some peel residue. If a citrus peel and/or a citrus pulp is incorporated into the litter of the invention, the peel or pulp or combined peel and pulp may be present in an amount of up to 100% by weight of the litter, but is preferably present in an amount ranging from about 5% to 95%, more preferably from 5% to 70%, even more preferably from about 5% to about 60%, and most preferably from about 10% to about 30% by weight of the animal litter.

The plant fiber used in accordance with the invention can include a combination of fibers. In one embodiment of the invention, the combination of fibers includes a combination of grain bran and citrus fiber. In this embodiment of the invention, the fiber can include a mixture of a grain bran, citrus peels and citrus pulp. When the fiber includes grain bran and a citrus peel/pulp combination, it is preferred that the grain bran is present in an amount of from about 10% to about 20% by weight of the litter, and the combination of citrus peel and citrus pulp is present in an amount of from about 10% to about 20% by weight of the animal litter.

The particles of litter should be sufficiently cohesive for use as an animal litter. In some embodiments of the invention, the particles can include a cohesiveness agent. The cohesiveness agent can be present in the animal litter of the invention in any suitable amount, which is preferably at least an amount effective to enhance the intraparticle cohesion of the animal litter particles. In accordance with this embodiment of the invention, the cohesiveness agent preferably is a polysaccharide. Any suitable polysaccharide can be used in conjunction with the invention and thus, for example, the cohesiveness agent can comprise materials such as maltodextrins, starches, fibers, flours, cellulosics, hemicellulosics (such as corn hull gum), xanthan gum, and the like. Preferably, the cohesiveness agent includes a starch, and most preferably, the cohesiveness agent includes a corn starch (e.g., an unmodified or non-gelatinized corn starch). When a starch is used in the animal litter of the invention, it is preferably present in an amount of about 10% by weight of the animal litter (excluding starch that is present in any other ingredient).

The cohesiveness agent may further include a fibrous material. Fibers for use as a cohesiveness agent include soluble and insoluble fibers such as apple fiber, barley-bran flour, barley-flour, brewers spent grain, carrageenan gum, citrus fiber, citrus pulp sacs, cocoa, corn bran, corn fiber, dried cranberries, fig powder, guar gum, gum agar, gum Arabic, locust bean gum, oat bran, oat fiber, pea fiber, powdered cellulose, dried prunes, defatted rice bran, stabilized rice bran, rice fiber, sodium carboxymethylcellulose, soy fiber, sugar beat fiber, wheat bran, and defatted wheat germ. Other suitable fibers include, for example, cellulose, microcrystalline cellulose, resistant starch, chitin/chitosan, methylcellulose, hydroxypropyl methylcellulose, carboxymethylcellulose, pectin, alginate, karaya, tragacanth, gellan, arabinogalactan, inulin, konjac flour, psyllium seed husk, curdlan, and polydextrose. It is contemplated that some of these materials will function as sorbents in some embodiments of the invention. To the extent that a cohesiveness agent is indeed in the litter formation, the cohesiveness agent is an ingredient that is different from the "sorbent." In other words a litter that is said to include both a "sorbent" and a "cohesiveness agent" will have separate ingredients for the sorbent and the cohesiveness agent, even though the cohesiveness agent may have its own sorption properties.

The cohesiveness agent of the invention also can include a supplemental cohesiveness agent. The supplemental cohesiveness agent can be present in any amount sufficient to assist the cohesiveness agent in enhancing the cohesiveness of the animal litter particles. Suitable supplemental cohesiveness agents are described in, for example, U.S. Pat. No. 6,098,569. One preferred supplemental cohesiveness agent is sodium chloride.

In some embodiments of the invention, the animal litter includes a lubricant. The lubricant can be present in any amount sufficient to facilitate the compaction of the animal litter composition into particles, as described herein. Preferred lubricants include, for example, fats and oils. Exemplary fats include lauric fats, such as babassu, coconut and palm kernel, and animal fats, such as butter oil, chicken fat, lard and beef tallow. Exemplary oils include fish oils, such as menhaden, and vegetable oils. Preferred vegetable oils include, for example, canola, cocoa butter, corn, cottonseed, olive, palm, peanut, rapeseed, soybean and sesame. Preferably, the lubricant is a vegetable oil because animals are often attracted to animal fats and fish oils as a food source.

Because the animal litter of the invention is made from biodegradable materials, the litter is subject to spoilage, such as by molding or bacterial action. To prevent or inhibit such spoilage, the litter can include a microbial inhibitor. A microbial inhibitor can be present in any amount effective to inhibit or prevent the spoilage of the animal litter. Typically, any ingredient capable of maintaining a pH of the animal litter from about 3 to about 5.5 is effective to prevent or inhibit spoilage of the animal litter.

In one embodiment of the invention, the spoilage inhibitor is a mold inhibitor. Any suitable mold inhibitor can be employed in conjunction with the invention. The mold inhibitor can include, for example, sodium chloride (which can also provide supplemental cohesive properties), propionic acid, propionate salts (e.g., sodium propionate, calcium propionate and the like), citric acid, citric acid salts (e.g., sodium citrate, calcium citrate, potassium citrate and the like), benzoate salts (e.g., sodium benzoate), parabens (e.g., methylparaben, ethylparaben, propylparaben and the like), sorbic acid, and sorbic acid salts (e.g., potassium sorbate and the like), lactic acid and lactic acid salts, acetic acid and acetic acid salts, alginic acid and alginic acid salts, and any combination thereof.

Preferably, the mold inhibitor includes citric acid, sodium chloride, potassium sorbate, or any combination thereof. More preferably, the mold inhibitor includes a combination of citric acid, sodium chloride and potassium sorbate or a combination of citric acid and sodium chloride. When citric acid is used, it is preferably present in an amount of about 0.5% to 2% by weight of the animal litter. When sodium chloride is used, it is preferably present in the animal litter of the invention in an amount of about 2% by weight of the animal litter (sodium chloride is believed to function as a supplemental cohesiveness agent when used in this amount). When potassium sorbate is used, it is preferably present in the animal litter of the invention in an amount of from 0.1-0.5%, more preferably from 0.1-0.2%, by weight of the animal litter. Other microbial inhibitors may be included if desired, and such ingredients can be present in any amount suitable for their intended purpose.

In one embodiment of the invention, the animal litter comprises discrete plural particles composed of from about 10% to about 90% whole corn meal, from about 5% to about 90% of a plant fiber selected from the group consisting of corn bran, citrus peel, citrus pulp, and any combination thereof, from 0% to about 10% of a cohesiveness agent, from 0% to about 5% of a virgin grain germ, (preferably from 0% to about 3%) and from 0% to about 5% of a mold inhibitor, the percentages being expressed by dry solids weight of the animal litter. In another embodiment of the invention, the litter comprises discrete plural particles composed of ground whole corn, the ground whole corn being present in an amount of at least 30% by weight; corn germ, the corn germ being present in an amount of at least 3% by weight; and starch. The germ may be present in an amount of at least 5%. The corn germ may be spent or unspent corn germ, but preferably is unspent (virgin) germ. In another embodiment of the invention, the litter comprises discrete plural particles composed of ground corn, the ground corn being present in an amount of at least 30% by weight; spent corn germ, the spent corn germ being present in an amount of at least 3% by weight; a citrus residue, the citrus residue being present in an amount of at least 10% by weight; and starch. The germ may be present in an amount of at least 5%.

The animal litter of the invention preferably has a moisture content sufficiently high to prevent the particles of animal litter from becoming friable and sufficiently low to allow additional moisture to be absorbed. Preferably, the moisture content of the inventive animal litter is less than about 30% based on the weight of the litter. More preferably, the moisture content ranges from about 3% to about 25%; even more preferably, the moisture content ranges from about 5% to about 20%; and most preferably the moisture content is from about 8% to about 15%. It is contemplated that some of the moisture in the animal litter will be present originally in the sorbent materials and/or cohesiveness agent.

In exemplary embodiments, the animal litter of the invention has been found effective in suppressing odors of animal waste such as animal urine. Animal urine contains urea, allantoin, or other compounds which break down to form ammonia. The ammonia odor of spent animal litter is often considered to be objectionable. Animal litters made in accordance with the invention will be effective in substantially reducing ammonia odors, and a litter box (housed or exposed) containing such litter will remain substantially free from ammonia odors for about 30 hours or more after the animal has excreted waste into the litter.

The animal litter of the invention preferably has a density sufficient to allow interparticle binding, yet that will minimize the weight of the litter. The litter preferably has a bulk density ranging from about 500-900 kg/m$^3$. Lighter density may have a tendency to make the litter too light and result in "tracking" by an animal, such as a cat. Density preferably is evaluated after loosely filling a container and measuring the weight of a specific volume of the litter.

A typical (although not necessarily optimal) particle size distribution of the animal litter of the invention is listed in Table 6.3 of Example 6, below. Preferred particle size ranges are set forth below (the values expressed signify preferred ranges under the procedure outlined in Example 6).

| +8 mesh | +14 mesh | +20 mesh | +30 mesh | +40 mesh | +80 mesh | Pan |
|---|---|---|---|---|---|---|
| 5–30 | 50–80 | 10–20 | <6 | <3 | <2 | <1 |

It will be appreciated that the particle size distribution can have an effect on the functional properties of the animal litter of the invention. If there is a relatively high population of very large particles, the litter may absorb liquids more slowly and also may be less effective in masking ammonia odor or other undesirable odors of spent animal litter. On the other hand, a relatively high population of small particles or fines can result in "tracking" and reduced clump strength.

Because the animal litter of the invention is to be used to absorb animal waste, e.g., urine, the litter should have an absorption capacity sufficient to allow the animal litter to so function. The absorption capacity of the litter of the invention preferably is at least about 0.05 ml water per gram of litter, more preferably ranges from about 0.5 to about 1.5 ml/g, and most preferably ranges from about 0.8 to about 1.2 ml/g. The absorption capacities specified herein are determined per gram of animal litter, based on the absorption of deionized water. Preferred absorption capacity ranges based on the absorption of deionized water are believed to approximate that of animal urine.

Other properties may be desired of an animal litter. For example, to minimize inconvenience and mess associated with packaging, transporting, and using the litter, the litter preferably generates a minimal amount of dust. The preferred litters of the present invention do not generate substantial dust, and ordinarily do not require dust reducing agents (although such may be added if desired). Moreover, the preferred litters of the present invention have a sand-like texture that is not fluffy, which is preferred by domestic animals such as cats.

Another preferred property is clumping efficiency. Clumping efficiency is the amount of litter required to form a clump with a given volume of liquid, with lower amounts of required litter corresponding to higher clumping efficiencies. Preferably, to absorb 30 ml animal urine, less than about 60 g of litter is required; more preferably, less than about 40 g is required.

Other desired properties include biodegradability and tendency to remain clumped over time. Biodegradability is a particularly preferred property when it is desired to dispose of clumps of litter by flushing them into the toilet. The litter of the invention is believed to be at least as biodegradable as other grain-based litters, and thus the litter of the invention may be disposed of by flushing, even into a septic system. Moreover, the litter of the invention exhibits controlled water-absorbing capacity, making it easily flushable down a toilet without excessive expansion. This property can help avoid blockages of drain pipes, e.g., when cat owners flush the soiled litter down the toilet. Tendency to remain clumped refers to the stability of the clump of the soiled litter. A clumping litter should remain clumped for at least 48 hours after the clump has formed. The litters of the invention have an excellent tendency to remain clumped.

The invention further provides a process for preparing an animal litter. Generally, the process comprises compacting ingredients forming the animal litter into discrete plural particles of a size suitable for tise as a litter. In some embodiments, the particle size is accomplished by reducing a larger mass to the desired size. Preferably, the process includes a step of compacting or compressing the particles of animal litter into granules or pellets, which most preferably is accomplished in a pelletizing operation. The stabilizer or mold inhibitor, cohesiveness agent, and/or lubricant, when used, can be added at any suitable stage, and preferably are mixed with the other components of the litter in the desired proportions prior to pelletizing of the grain-based substrate.

When a pellet mill is employed, the moisture content in the pellet mill feed preferably is in the ranges described herein with respect to the moisture content in the finished product, and preferably is 10-14%. Optionally, moisture can be added to the feedstock in the form of liquid water to bring the feedstock to the desired moisture content. The temperature in the pellet mill preferably is brought to about 70-90° C., e.g., 82° C., using steam. The pellet mill may be operated under any conditions that impart sufficient work to the feedstock to provide pellets. It is believed that the particle size of the starting materials, the temperature within the pellet mill, and other variables can affect the properties of the final product. The pellet mill can be operated with a suitable die (e.g., a $\frac{3}{32}$ in.×$\frac{5}{8}$ in. die) at a pressure and temperature effective to provide pellets. The pellets preferably are then crumbled in a pellet mill crumbler to provide discrete plural particles having a particle size capable of passing through an 8 mesh screen but being retained on a 20 mesh screen. As described herein, lubrication is preferably provided by adding a virgin germ. In other embodiments, lubrication may be provided by adding another lubricant, such as a vegetable oil.

The invention further provides a method for removing animal waste, which method generally contemplates providing a container containing an animal litter of the present invention, allowing an animal to excrete waste into the container, whereby moisture from the waste causes the animal litter to agglomerate into at least one clump; and removing the clump of litter from the container and preferably any solid waste so as to remove the animal waste. By "container" is meant to include any enclosed or partially enclosed area, such as a litter box, a cage, a stall, a pen (such as a poultry coop), or the like. The method for the removal of animal waste is contemplated to be useful for all animals capable of excreting waste on land, such as cats, dogs, mice, birds, gerbils, reptiles, and other animals, and finds particular applicability in connection with removal of waste from domestic house cats. The method for the removal of animal waste also may be useful for the removal of waste generated by farm animals such as chickens, livestock, or the like.

The following examples further illustrate the invention, but should not be construed as in any way limiting the scope of the invention.

EXAMPLES

The following experimental protocols were used in the examples that follow.

Moisture Content: The moisture content was assayed using an Ohaus Moisture Balance.

Synthetic Animal Urine: Clumping properties were determined using synthetic animal urine. The synthetic animal urine was prepared by dissolving in de-ionized water 8.60 g of calcium chloride dihydrate ($CaCl_2.2H_2O$), 100.80 g of urea ($NH_2CONH_2$) and 4.20 ml of a 28% (wt./wt.) aqueous ammonium hydroxide ($NH_4OH$). The resulting solution was brought to a total volume of one liter by dilution with deionized water. The pH of the resulting solution was adjusted to approximately 5.7 using dilute aqueous HCl to form the synthetic animal urine.

Clumping Properties and Apparent Water Sorption Capacity: Sample litters were tested by placing a bed of the sample litter into a 5 in.×5 in.×4 in. box. The depth of the litter bed in the box was about 2.5-3 in. Wettability and clumping properties were determined by draining 30.0 ml of water or synthetic urine from a buret vertically into the center of the litter sample bed. In each run, the bottom of the box was checked for "run through." If the liquid wetted the bottom of the box, the result was referred to as "Ran Through."

Wettability was evaluated by draining 30 ml of deionized water or 30 ml of synthetic animal urine from a buret. The wettability was characterized according to the following criteria:
  excellent: water disappeared within 20 seconds;
  fair: water disappeared between 21 and 30 seconds; or
  poor: water did not disappear within 30 seconds.

After five minutes of aging, the wetted clump was removed using the tines of a dinner fork and was weighed. The weight of the clump, in grams, is referred as "5-minute clump weight." No clump weight was recorded if run through was observed.

Cohesiveness: The cohesiveness was evaluated for clumps that were allowed to age overnight, according to the following criteria:
  excellent: the wetted clump could be removed intact;
  fair: the wetted clump surface was friable, such that some particles remained behind, while the rest of the wetted clump could be removed intact; or
  poor: the wetted clump broke apart or disintegrated.

Clump Strength: The clump strength was measured after 5 minutes of aging using a TA-XT2 Texture Analyzer (Texture Technologies, Scarsdale, N.Y.). After five minutes of aging, the wetted clump was removed using the tines of a dinner fork, weighed, and laid upside down in a weighing dish. The dish was then put on the stage of the TA-XT2. The analyzer was programmed to compress the clumps with a one inch diameter plastic cylinder (TA-11). The cylinder was programmed to travel 25 mm after touching the surface of the clump (trigger force 25 gram) at the speed of 1.0 mm/second. The force of compression was measured and recorded in grams during the course of the compression, with force and resistance to compression increasing over time. The clump would be considered to "break up" when it would crack and break, normally resulting in a decrease or "yield" in the force. The "clump strength" was recorded as the force, in grams, needed to break up the clump.

Ammonia Odor Masking: To determine the ammonia odor masking properties, a synthetic cat urine including 20 ml of 28% (wt./wt.) aqueous ammonium hydroxide in one liter of deionized water was prepared. The synthetic cat urine (4.0 ml) was added to a sample of litter that was placed in an 8 oz. cup with a lid. Clumps were allowed to age for about five minutes, and each cup was shaken in order to simulate the covering of a deposit by a cat. A human test panel was used to qualitatively evaluate the samples.

Fresh Litter Odor: The litters were qualitatively evaluated for litter odor.

Example 1

This example demonstrates the compositions of various preferred embodiments of the invention. The ingredients are expressed in terms of weight percentage based on the overall weight of the litter:

TABLE 1

| | % by Weight of Composition Sample | | | | | | | | | |
|---|---|---|---|---|---|---|---|---|---|---|
| Ingredient | 1 | 2 | 3 | 4 | 5 | 6 | 7 | 8 | 9 | 10 |
| Ground Corn Meal | 56.5 | 66.5 | 61.5 | 51.5 | 66.5 | 51.5 | 46.5 | 56.5 | 56.5 | 68.5 |
| Defatted Corn Germ Meal | 0 | 0 | 0 | 0 | 0 | 0 | 0 | 0 | 0 | 0 |
| Ground Virgin Corn Germ | 0 | 0 | 5 | 5 | 0 | 0 | 0 | 5 | 5 | 3 |
| Corn Bran | 30 | 0 | 0 | 0 | 10 | 15 | 20 | 15 | 10 | 15 |
| Starch | 10 | 10 | 10 | 10 | 0 | 10 | 10 | 10 | 10 | 10 |
| Mixture of Ground Citrus Peel and Citrus Pulp | 0 | 20 | 20 | 30 | 20 | 20 | 20 | 10 | 15 | 0 |
| Citric Acid | 1.5 | 1.5 | 1.5 | 1.5 | 1.5 | 1.5 | 1.5 | 1.5 | 1.5 | 1.5 |
| NaCl | 2 | 2 | 2 | 2 | 2 | 2 | 2 | 2 | 2 | 2 |
| Potassium Sorbate | 0 | 0 | 0 | 0 | 0 | 0 | 0 | 0 | 0 | 0 |

TABLE 1-continued

| Ingredient | % by Weight of Composition Sample | | | | | | | | | |
|---|---|---|---|---|---|---|---|---|---|---|
| | 11 | 12 | 13 | 14 | 15 | 16 | 17 | 18 | 19 | 20 |
| Ground Corn Meal | 63.5 | 58.5 | 51.5 | 56.5 | 61.5 | 36.5 | 41.5 | 33.5 | 66.4 | 66.3 |
| Defatted Corn Germ Meal | 0 | 0 | 5 | 5 | 5 | 25 | 25 | 33 | 0 | 0 |
| Ground Virgin Corn Germ | 3 | 3 | 5 | 5 | 5 | 5 | 5 | 5 | 5 | 5 |
| Corn Bran | 20 | 25 | 25 | 20 | 15 | 20 | 15 | 15 | 15 | 15 |
| Starch | 10 | 10 | 10 | 10 | 10 | 10 | 10 | 10 | 10 | 10 |
| Mixture of Ground Citrus Peel and Citrus Pulp | 0 | 0 | 0 | 0 | 0 | 0 | 0 | 0 | 0 | 0 |
| Citric Acid | 1.5 | 1.5 | 1.5 | 1.5 | 1.5 | 1.5 | 1.5 | 1.5 | 1.5 | 1.5 |
| NaCl | 2 | 2 | 2 | 2 | 2 | 2 | 2 | 2 | 2 | 2 |
| Potassium Sorbate | 0 | 0 | 0 | 0 | 0 | 0 | 0 | 0 | 0.1 | 0.2 |

Example 2

This example demonstrates a process for preparing an animal litter that includes a combination of corn meal and corn bran.

Whole kernel corn, at moisture content of 10-14%, was ground on a Jacobson Hammer Mill using an appropriate screen (¼ in. screen, or ⅛ in., 5/32 in., 3/16 in., or 1/16 in. or other screen). The ground corn meal was blended with corn bran, starch, citric acid, and sodium chloride in a mixer, in the proportions indicated in Table 2, then the mixture was pelletized on a pilot-scale California Pellet Mill with a 3/32 in.×⅝ in. die. Alternatively, a production-scale California Pellet Mill with, for instance, a 3/32 in., 5/32 in., or ⅛ in. die can be used. Before pelletizing, the blended ingredients can be adjusted to a moisture content of 10-14%, or carried on as-is ("as-is"). The temperature of the pelletizing step was adjusted to 80-95° C. by adding steam to the pellet mill.

The pellets formed in the pelletizing step were crumbled with a pellet mill crumbler to form discrete plural particles having a primary particle size that pass through an 8-mesh screen and are retained on a 20-mesh screen.

The corn bran used in this example was fine-ground corn bran, which can be purchased commercially. The starch used in this example was unmodified corn starch from Grain Processing Corporation (Muscatine, Iowa).

TABLE 2

| Ingredients | Percentage based on total weight (as-is) |
|---|---|
| Ground Corn Meal (¼ in. screen) | 56.5 |
| Corn bran | 30 |
| Starch | 10 |
| Citric Acid | 1.5 |
| Sodium Chloride | 2 |
| Test | |
| 5-min. Clump Weight (g) | 68.5 |

Example 3

This example demonstrates the effect of adding virgin germ to the litter composition.

The litter samples in this example were prepared in accordance with Example 2, except that ground virgin corn germ obtained from a corn wet milling process was blended in the mixer with the corn meal, corn bran and other ingredients before pelletizing. The virgin germ was coarsely ground through either a hammer mill or an Alpine mill prior to blending. A fixed amount of ground virgin germ (3% based on the total weight) was used in the formulae while varying the level of corn bran. The results are shown in Table 3.

TABLE 3

| Ingredients | Percentage based on total weight (as-is) | | | |
|---|---|---|---|---|
| | Sample 3-A | Sample 3-B | Sample 3-C | Comparative Sample 3-D |
| Ground Corn Meal (¼ in. screen) | 68.5 | 63.5 | 58.5 | 66.5 |
| Corn bran | 15 | 20 | 25 | 20 |
| Starch | 10 | 10 | 10 | 10 |
| Ground virgin germ | 3 | 3 | 3 | 0 |
| Sodium Chloride | 2 | 2 | 2 | 2 |
| Citric Acid | 1.5 | 1.5 | 1.5 | 1.5 |
| Test | | | | |
| 5-min. Clump Weight (g) | 65.8 | 66.9 | 62.9 | Ran through |

The data shown in Table 3 demonstrate that adding ground virgin germ improves the clumping properties of litter and provided litters with relatively low clump weight.

Example 4

This example demonstrates the production of exemplary litters of the present invention. The litters prepared in this example were prepared in accordance with Example 2, except that the blend of ground corn meal and the other ingredients were pelletized on a production-scale 100 horse-power California Pellet Mill with a 3/16 in.×2½ in. die or a 5/32 in.×2 in. VR+NVR die (variable relief+non-variable relief). In addition, the virgin germ was mixed with one part of defatted corn germ meal ("DCM"), and the mixture was ground through a Jacobson Hammer Mill with a ¼ in. screen prior to blending with the corn meal and other ingredients.

TABLE 4

| Ingredients | Percentage based on total weight (as-is) | | |
|---|---|---|---|
| | Sample 4-A | Sample 4-B | Sample 4-C |
| Die Size | 3/16 in. × 2½ in. | 5/32 in. × 2 in. | 5/32 in. × 2 in. |
| Ground Corn Meal (¼ in. screen) | 51.5 | 56.5 | 61.5 |
| Corn bran | 25 | 20 | 15 |
| Starch | 10 | 10 | 10 |
| 50:50 (wt./wt.) ground (virgin germ + DCM) (equal to 5 wt. % virgin germ) | 10 | 10 | 10 |
| Citric Acid | 1.5 | 1.5 | 1.5 |
| Sodium Chloride | 2 | 2 | 2 |
| Test | | | |
| 5-min. Clump Weight (g) | $\mu = 64.9$ $\sigma = 0.9$ | 63.0 | $\mu = 59.8$ $\sigma = 1.6$ |
| Clump Strength (g) | $\mu = 542.7$ $\sigma = 57.1$ | | $\mu = 476.3$ $\sigma = 33.7$ |
| Ammonia Masking | excellent | excellent | excellent |
| Comments | good clump, slightly flatter clump | good tight clump | good clump |

Sample 4-C was field tested on cats by several cat owners. The cat owners who participated in the test were asked to judge the litter with respect to at least 10 different attributes including clump-forming ability, ammonia odor masking properties, acceptability to the cats, etc. The litter ranked excellent in forming clumps, masking ammonia odor, acceptability to cats and other attributes.

The litters prepared in accordance with this example exhibited clumping properties that were comparable to each other even when the whole corn used in the litter was ground to a variety of different particle size distribution ranges (e.g., through a hammer mill with a ¼ in. or a 1/16 in. screen). Thus, the corn can be ground into a wide range of particle sizes while maintaining good clumping properties. The ability to vary the particle size distribution without sacrificing clumping properties is advantageous in that the particle size can be adjusted to minimize dust production while maintaining desirable clumping properties.

Example 5

This example demonstrates the production of animal litters in accordance with the present invention.

In this example, a defatted corn germ meal and spent corn germ obtained from dry milling and oil-extracted with hexane (see, e.g., U.S. Pat. No. 6,098,569) were used in combination with the ground corn. The litters were prepared in accordance with Example 3, using a production scale California Pellet Mill with a 3/16 in.×2½ in. die or a 5/32 in.×2 in. VR+NVR die. Virgin germ was used as a lubricant in the formulas. The virgin germ was blended with either DCM or whole corn at 1:1 ratio and then ground through a hammer mill prior to blending with the other ingredients. The amount of the blend of virgin germ used in the formulas was 10% based on the total weight of formula (equal to 5% ground virgin germ based on the total weight). The results are shown in Table 5.

TABLE 5

| Ingredients | Percentage based on total weight (as-is) | | |
|---|---|---|---|
| | Sample 5-A | Sample 5-B | Sample 5-C |
| Die Size | 3/16 in. × 2½ in. | 5/32 in. × 2 VR + NVR | 5/32 in. × 2 VR + NVR |
| Ground Corn Meal (¼ in. screen) | 36.5 | 36.5 | 28.5 |
| Defatted Corn Meal | 20 | 25 | 33 |
| Corn Bran | 20 | 15 | 15 |
| 50:50 (wt./wt.) Ground (Virgin germ + DCM) | 10 | 0 | 0 |
| Ground 50:50 (wt./wt.) Blend of the Virgin Germ + Corn | 0 | 10 | 10 |
| Starch | 10 | 10 | 10 |
| Citric Acid | 1.5 | 1.5 | 1.5 |
| Sodium Chloride | 2 | 2 | 2 |
| Test | | | |
| 5-min. Clump Weight (g) | $\mu = 59.4$ $\sigma = 0.3$ | $\mu = 59.7$ $\sigma = 0.9$ | $\mu = 63.74$ $\sigma = 1.1$ |
| Clump Strength (g) | $\mu = 599.0$ $\sigma = 109.2$ | $\mu = 378.2$ $\sigma = 17.5$ | $\mu = 444$ $\sigma = 40.0$ |
| Ammonia Masking | excellent | excellent | excellent |
| Comments | good clump, flatter clumps | good tight clump | good strong clump |

Samples 5-A, 5-B and 5-C exhibited low clump weight, good clump strength and excellent ammonia odor masking properties.

Example 6

This example demonstrates the effect of degermed and debranned corn meal particle size on litter performance. Seven corn meals and flours with different particle sizes, obtained commercially from a corn dry-miller, were tested to determine the effect of corn meal particle size on litter performance. Litters were made in the same manner as in Example 5. Samples 6-A to 6-G were processed corn meals with the germ and bran removed. Sample 6-H was whole ground corn meal. The test was conducted by stacking the mesh screens with decreasing pore size, i.e., 20-mesh screen atop a 25-mesh screen atop a 30-mesh screen, etc. Corn meal was then distributed on the top screen of the screen stack, i.e., the screen having the largest pore size, and the top screen was then removed from the screen stack for analysis. The values given below in Table 6.1 are expressed as the weight percent of litter that remained on each screen after the screen was removed from the screen stack. The litter formulation and properties are set forth below in Table 6.2.

TABLE 6.1

| Type of corn meal/flour | Description | 20 mesh | 25 mesh | 30 mesh | 40 mesh | 50 mesh | 60 mesh | 80 mesh | 100 mesh | 200 mesh | Through 200 mesh |
|---|---|---|---|---|---|---|---|---|---|---|---|
| Corn meal 6-A | Coarse corn meal CCM250 | 0.3 | 8.7 | 43 | 45 | 2 | 1 | | | | |
| Corn meal 6-B | Coarse corn meal CCM254 | 0.5 | | 14.5 | 40 | 25 | 20 | | | | |
| Corn meal 6-C | Coarse corn meal CCM255 | | | 35 | 50 | | 13.5 | 1.5 | | | |
| Corn meal 6-D | Coarse corn meal FCM350 | | | 3 | 85 | 10 | 2 | | | | |
| Corn meal 6-E | Coarse corn meal CC401 | | | | 0.3 | | | 92 | 7.7 | | |
| Corn meal 6-F | Finer corn meal CCF600 | | | 0.1 | 0.2 | | 2.7 | 22 | 40 | 35 | |
| Corn meal 6-G | Finer corn meal CCF 610 | | | | 0.1 | | 2.4 | 30 | 35 | 32.5 | |
| Ground whole corn (1/16" screen) | | 21.6 | | | 38.5 | | | 37.2 | | 2.6 | 0 |

Note:
CCM250, CCM254, CCM255, FCM350, CC401, CCF600, CCF610 are commercial defatted (degermed) corn meal/flour

TABLE 6.2

| Ingredients | Percentage based on total weight (as-is) | | | | | | | |
|---|---|---|---|---|---|---|---|---|
| Corn meal 6-A | 41.5 | | | | | | | |
| Corn meal 6-B | | 41.5 | | | | | | |
| Corn meal 6-C | | | 41.5 | | | | | |
| Corn meal 6-D | | | | 41.5 | | | | |
| Corn meal 6-E | | | | | 41.5 | | | |
| Corn meal 6-F | | | | | | 41.5 | | |
| Corn meal 6-G | | | | | | | 41.5 | |
| Ground whole corn (1/16" screen) | | | | | | | | 41.5 |
| Ground 50:50 blend of defatted corn germ meal (DCM-120 and "virgin" corn germ | 10 | 10 | 10 | 10 | 10 | 10 | 10 | 10 |
| Defatted corn germ meal (DCM-120) | 20 | 20 | 20 | 20 | 20 | 20 | 20 | 20 |
| Corn bran (Ultra-fine: NU200085) | 15 | 15 | 15 | 15 | 15 | 15 | 15 | 15 |
| Starch (B200) | 10 | 10 | 10 | 10 | 10 | 10 | 10 | 10 |
| Citric acid | 1.5 | 1.5 | 1.5 | 1.5 | 1.5 | 1.5 | 1.5 | 1.5 |
| Salt | 2 | 2 | 2 | 2 | 2 | 2 | 2 | 2 |
| Potassium Sorbate | 0.1 | 0.1 | 0.1 | 0.1 | 0.1 | 0.1 | 0.1 | 0.1 |
| Test | | | | | | | | |
| Average 5-min Clump Wt. (g) | 71.8 | Ran through | Ran through | Ran through | Ran through | 56.6 | 61.8 | 58.6 |

From the table, it is seen that particle size was critical to the clumping of the litter. The finer corn flour 6-F and 6-G made good clumping litter. It is believed that a high concentration of smaller particles, i.e., less than 60% mesh, is desired to make a clumping litter. Sample 6-F had better moisture control than the sample 6-H.

The particle size distribution of litter Sample 5-C of Example 5, above, was also measured using the same method employed above with screen sizes of 8 mesh (2360 micron), 14 mesh (1400 micron), 20 mesh (850 micron), 30 mesh (600 micron), 40 mesh (425 micron), and 80 mesh (180 micron). The bulk density was measured in kilograms per cubic meter ($kg/m^3$). The particle size distribution of litter Sample 5-C is shown below in

TABLE 6.3

| Sample | Bulk Density | +8 mesh | +14 mesh | +20 mesh | +30 mesh | +40 mesh | +80 mesh | pan |
|---|---|---|---|---|---|---|---|---|
| 5-C | 608 | 29.6 | 53.3 | 14.4 | 1.9 | 0.4 | 0.4 | 0.3 |

Example 7

This example demonstrates the production of an exemplary animal litter using as a plant fiber a combination of ground citrus peels and ground citrus pulp.

The litters prepared in this example were prepared in accordance with Example 2, except that the corn bran was replaced with ground citrus peels. The citrus peels/pulps were ground using a Jacobson Mill through a ¹⁄₁₆ in. screen prior to blending. The ground corn meal was blended with other the ingredients and pelletized on a pilot-scale California Pellet Mill with a ³⁄₃₂ in.×⅝ in. die. The results are shown in Table 7.1.

TABLE 7.1

| Ingredients | Percentage based on total weight (as-is) Sample 7-A |
|---|---|
| Ground Corn Meal (¼ in. screen) | 66.5 |
| Ground Citrus Peel | 20 |
| Starch | 10 |
| Citric Acid | 1.5 |
| Sodium Chloride | 2 |
| Test | |
| 5-min. Clump Weight (g) | 66.9 |

The particle size distribution of the ground peels/pulps is shown below in Table 7.2.

TABLE 7.2

| | Hammer Mill Screen (inches) | +20 mesh | +40 mesh | +80 mesh | +120 mesh | +200 mesh | Through 200 mesh |
|---|---|---|---|---|---|---|---|
| Ground Citrus Peel Pellet "A" | ¹⁄₁₆ | 6.5 | 32.1 | 35.2 | 18.6 | 5.4 | 1.9 |
| Ground Citrus Peel Pellet "B" | ⅛ | 21.2 | 34 | 28.5 | 14.7 | 2.1 | 0.2 |

Grinding the citrus peel/pulp pellets through a ¹⁄₁₆ in. screen or smaller is recommended. When coarsely ground citrus peels/pulps were made by grinding through a ⅛ in. screen, the litters made thereby did not clump quickly enough and resulted in run through.

Example 8

This example demonstrates the effect of adding ground virgin germ on clump weight of an exemplary animal litter containing ground citrus peels/pulps as a plant fiber source.

The litters in this example were prepared in accordance with Example 7, except that ground virgin corn germ was used in two of the litter samples. The virgin germ was coarsely ground through an Alpine mill prior to blending. After blending, the ingredients were pelletized on a pilot-scale California Pellet Mill with a ³⁄₃₂ in.×⅝ in. die. The results are shown in Table 8.

TABLE 8

| | Percentage based on total weight (as-is) | | |
|---|---|---|---|
| Ingredients | Sample 8-A | Sample 8-B | Sample 8-C |
| Ground Corn Meal (¼ in. screen) | 66.5 | 61.5 | 51.5 |
| Ground Citrus Peel | 20 | 20 | 30 |
| Starch | 10 | 10 | 10 |
| Ground Virgin Germ | 0 | 5 | 5 |
| Citric Acid | 1.5 | 1.5 | 1.5 |
| Sodium Chloride | 2 | 2 | 2 |
| Test | | | |
| 5-min. Clump Weight (g) | 66.9 | 63.2 | 63.1 |
| Clump Strength (g) | not measured | 442.5 | 309.3 |
| Ammonia-Masking | good | good | good |

The foregoing data demonstrates the improvement in clumping properties exhibited by the animal litters to which ground virgin germ was added, as shown by the reduction in clump weight of litter Samples 8-B and 8-C, relative to litter 8-A.

Example 9

This example demonstrates the effect of corn bran on clumping properties of exemplary animal litters that contain citrus peels/pulps as a plant fiber.

The litters prepared in this example were prepared in accordance with Example 7, except that ground corn bran was added in varying quantities. The results are shown in Table 9.

TABLE 9

| | Percentage based on total weight (as-is) | | |
|---|---|---|---|
| Ingredients | Sample 9-A | Sample 9-B | Sample 9-C |
| Ground Corn Meal (¼ in. screen) | 66.5 | 51.5 | 46.5 |
| Ground Citrus Peel Pellet "A" | 20 | 20 | 20 |
| Corn Bran | 0 | 15 | 20 |
| Starch | 10 | 10 | 10 |
| Citric Acid | 1.5 | 1.5 | 1.5 |
| Sodium Chloride | 2 | 2 | 2 |

TABLE 9-continued

| Ingredients | Percentage based on total weight (as-is) | | |
|---|---|---|---|
| | Sample 9-A | Sample 9-B | Sample 9-C |
| Test | | | |
| 5-min. Clump Weight (g) | 66.9 | 66.7 | 65.4 |
| Clump Strength (g) | not measured | 556.7 | 713.2 |
| Ammonia-Masking | good | good | good |

The litters prepared in this example generally exhibited an improvement in clumping properties with increasing corn bran, as evidenced by the reduction in clump weight.

Example 10

This example demonstrates exemplary animal litters that contain whole corn meal, a combination of ground corn bran and ground citrus peels/pulps, and ground virgin corn germ. The litters prepared in this example were prepared in accordance with Example 9, except that ground virgin corn germ was added. The results are shown in Table 10.

TABLE 10

| Ingredients | Percentage based on total weight (as-is) | | |
|---|---|---|---|
| | Sample 10-A | Sample 10-B | Comparative Sample 10-C* |
| Ground Corn Meal (¼ in. screen) | 56.5 | 56.5 | 96.5 |
| Ground Citrus Peel | 10 | 15 | 0 |
| Corn Bran | 15 | 10 | 0 |
| Starch | 10 | 10 | 0 |
| Ground Virgin Germ | 5 | 5 | 0 |
| Citric Acid | 1.5 | 1.5 | 1.5 |
| Sodium Chloride | 2 | 2 | 2 |
| Test | | | |
| 5-min. Clump Weight (g) | 61.6 | 62 | 73.4 |
| Clump Strength (g) | 900.7 | 542 | not measured |
| Ammonia-Masking | excellent | excellent | good |

*Comparative Sample 10-C is in the form of pelletized ground corn meal. In addition to the ingredients listed above, Sample 10-C also includes 0.1% potassium sorbate.

Samples 10-A and 10-B exhibited good clumping properties as shown by the low clump weight and high clump strength.

Example 11

This example demonstrates exemplary animal litters that include various mold inhibitors. The animal litters prepared in this example were prepared in accordance with Example 2, except that ground virgin corn germ and a mold inhibitor were blended with the corn meal, corn bran and other ingredients prior to pelletizing. The results are shown below in Table 11.

TABLE 11

| Ingredients | Percentage based on total weight (as-is) | | | |
|---|---|---|---|---|
| | Sample 11-A | Sample 11-B | Sample 11-C | Sample 11-D |
| Ground Corn Meal (¼ in. screen) | 66.5 | 66.5 | 66.5 | 66.5 |
| Corn Bran | 15 | 15 | 15 | 15 |
| Starch | 10 | 10 | 10 | 10 |
| Ground Virgin Germ | 5 | 5 | 5 | 5 |
| Sodium Chloride | 2 | 2 | 2 | 2 |
| Citric Acid | 1.5 | 1.5 | 1.5 | 1.5 |
| Mold Inhibitor | 0.1% Luprosil ® (Calcium Propionate) | 0.1% Mold-X ® (Propionic Acid) | 0.1% Potassium Sorbate | 0.2% Potassium Sorbate |
| Test | | | | |
| 5-min. Clump Weight (g) | 63.8 | 61.0 | 59.4 | 61.6 |
| Litter Odor | very slight odor (acceptable) | very slight odor (acceptable) | no impact, no sour odor | no impact, no sour odor |

Propionate salts and propionic acid tended to produce a slightly sour odor in the litters, while potassium sorbate and sorbic acid had no impact on the odor of the litters.

Example 12

Citrus peel pellets and pectin peel were assayed for moisture, protein, fat, ash, crude fiber, and carbohydrate content. The following result were obtained.

TABLE 12.1

|  | Moisture | Protein | Fat | Ash | Crude Fiber | Other Carbohydrates |
|---|---|---|---|---|---|---|
| Citrus peel pellets | 7.21 | 5.97 | 2.42 | 7.28 | 18.18 | 58.94 |
| Pectin peel | 5.8 | 5.94 | 3.24 | 3.24 | 25.53 | 56.25 |

The citrus peel pellets and pectin peel were subjected to various milling and grinding operations. After these operations, the particle size distribution of the resulting product was determined on a series of screens ranging in size from 20 to +200 mesh. As set forth in Table 12.2 the products are designated citrus residue "A" through "G." The particle size distribution of these products is further shown in Table 12.2.

TABLE 12.2

|  |  | Process | +20 mesh | +40 mesh | +80 mesh | +120 mesh | +200 mesh | −200 mesh |
|---|---|---|---|---|---|---|---|---|
| Orange Pectin Peel | A | 1 pass Fitz Mill, 2 passes Alpine mill | 0.2 | 5.7 | 47.1 | 46.1 | 1.1 | 0.1 |
|  | B | 1 pass Fitz Mill, 1 pass Alpine mill | 2 | 16.4 | 43.4 | 31.9 | 6.6 | 0 |
|  | C | Ground through-40 mesh | 0.4 | 56 | 42.1 | 1.8 | 0.1 | 0 |
| Citrus peel pellets | D | 1 pass Fitz Mill, 2 passes Alpine mill | 0.3 | 10.2 | 53.4 | 34.7 | 1.4 | 0.1 |
|  | E | 1 pass Fitz Mill, 1 pass Alpine mill | 0.4 | 1.7 | 49.2 | 48.4 | 0.7 | 0 |
|  | F | Ground through-40 mesh | 1.8 | 10.2 | 42.8 | 42.8 | 5 | 0 |
|  | G | Jacobson Mill with 1/16" screen | 6.5 | 32.1 | 35.2 | 18.6 | 5.4 | 1.9 |

Example 13

Animal litters were prepared from the pectin peel or citrus pellet residue, combined with starch, salt and citric acid. The composition of these litters is shown in Table 13.1. These litters were made by grinding the pectin peel and citrus peel pellets through a Fitz Mill and an Alpine Mill and screening the residue through a 40 mesh screen, then blending the screened products with the other ingredients and pelletizing the ingredients in a California Pellet Mill with a 3/32×5/8 die. The litter made of orange pectin peels had good clumping ability and ammonia masking properties. The litter made from citrus peel pellets did not clump or absorb urine quickly enough. The pellets were than crumbled and fines were removed on 20 mesh screens. The animal litters were evaluated for clump weight, clump strength, cat acceptability, and urine odor masking. The results are shown in Table 13.2.

TABLE 13.1

|  | Pectin Peel | | Citrus Pellet | |
|---|---|---|---|---|
|  | % Total weight | | % Total weight | |
| Ground Pectin peel | 76.5 | | Ground Citrus pellet | 76.5 |
| Starch | 20 | | Starch | 20 |
| Salt | 2 | | Salt | 2 |
| Citric Acid | 1.5 | | Citric Acid | 1.5 |

TABLE 13.2

| Explanation | Average 5-min Clump Wt. (g)* | Clump Strength (gram)* | Cat acceptability | Masking cat urine odor |
|---|---|---|---|---|
| 76.5% Orange Pectin Peels + 20% starch | μ = 49.79 σ = 0.77 | μ = 389.80 σ = 31.12 | No objection | Excellent |
| 76.5% citrus peel/pulp pellets + 20% starch | Poor | ND | No objection | Excellent |

Litter made from citrus peels and pulps exhibited good ammonia control. Cat urine clumps were sealed in 1/2 gallon containers and the ammonia content in the headspaces was measured with Draeger tubes. The ammonia content after seven days was minimal. This was in marked contrast to the performance of two commercial litters, which exhibited significant ammonia release after three days.

The litter made from the pectin peels had a strong orange aroma. The litter made from citrus peel had a strong pungent odor. To address these problems, other ingredients were added.

Example 14

A defatted corn germ meal available from Lauhoff Grain Co. was added to pectin peel. The pectin peel was ground through a Fitz Mill and an Alpine Mill, then blended with other ingredients and pelletized on a pilot scale California Pellet Mill with a die size of 3/32×5/8. The pellets were crumbled and fines were removed by a 20-mesh screen. The following litters were prepared and evaluated for the properties recited.

TABLE 14

| Formulation* | | | | Masking |
|---|---|---|---|---|
| % Pectin peel | % DCM-120 | Clump Wt. (g) | Average 5-min Clump Strength (gram) | Cat acceptability | cat urine odor (ammonia) |
| 78 | 0 | μ = 49.8 σ = 0.8 | μ = 389.8 σ = 31.1 | No objection | Excellent |
| 44 | 44 | μ = 50.4 σ = 0.9 | μ = 361.7 σ = 28.7 | No objection | Excellent |
| 38 | 50 | μ = 52.1 σ = 0.9 | μ = 390 σ = 23.8 | No objection | Excellent |
| 30 | 54 | μ = 51.7 σ = 0.5 | μ = 367 σ = 21.4 | No objection | Excellent |
| 25 | 59 | μ = 52.5 σ = 0.6 | μ = 396.8 σ = 29.2 | No objection | Excellent |
| 20 | 64 | μ = 53.7 σ = 0.7 | μ = 440.5 σ = 34.8 | No objection | Excellent |
| 10 | 72.5 | μ = 56.4 σ = 0.6 | μ = 271.9 σ = 29.2 | | Excellent |
| 0 | 82.5 | μ = 64.9 σ = 2.2 | μ = 338.4 σ = 44.7 | No objection | Good |

*Other ingredients include 2% salt and balance corn starch.

It was observed that clumping strength, clump weight and aroma improved. Urine absorbing speed was increased, while gelling (which prevents urine absorption) was decreased.

Example 15

Litters were made and evaluated in the same manner as Example 14, except that citrus pellet residues were employed. Table 15.1 shows the various litters that were prepared and their properties.

TABLE 15.1

| Formulation | | Average | | | Masking |
|---|---|---|---|---|---|
| % ground citrus peel pellets | % DCM-120 | 5-min Clump Wt. (g) | Clump Strength (gram) | Cat acceptability | cat urine odor (ammonia) |
| 78 | 0 | Poor | ND | No objection | Excellent |
| 40 | 48 | μ = 59.8 σ = 1.4 | μ = 536.5 σ = 54.0 | | Excellent |
| 30 | 54 | μ = 59.8 σ = 0.9 | μ = 655.5 σ = 61.8 | | Excellent |
| 20 | 64 | μ = 60.7 σ = 2.6 | μ = 558.1 σ = 97.0 | No objection | Excellent |
| 15 | 69 | 62.6 | ND | No objection | Excellent |
| 0 | 82.5 | μ = 64.9 σ = 2.2 | 3μ = 38.4 σ = 44.7 | No objection | Good |

*Other ingredients include 2% salts with the balance corn starch.

A litter having the formula set forth in Table 15.3 was made on a large scale pellet mill. The citrus pellets were ground with a Jacobson Mill through a 1/16" opening screen. The litter had very good clumping and odor masking properties.

The ground citrus pellet peel had the following particle size profile.

TABLE 15.2

| +20 Mesh | +40 Mesh | +80 Mesh | +120 Mesh | +200 Mesh | −200 Mesh |
|---|---|---|---|---|---|
| 6.5 | 32.1 | 35.2 | 18.6 | 5.4 | 1.9 |

The formula of the litter is set forth below in Table 15.3. The properties of the litter are set forth in Table 15.4.

TABLE 15.3

| Die Size | Ground Cattle-feed Orange peel pellets (1/16" Screen) | Starch (%) | DCM-120 de-fatted corn germ (%) | Citric acid (%) | Salt (%) | Adjust Moisture to (%) |
|---|---|---|---|---|---|---|
| 3/16" × 2 1/2" (CPM# C8564) | 20 | 14 | 62.5 | 1.5 | 2 | 12.0 to 12.5 |

TABLE 15.4

| Average 5-min Clump Wt. (g) | Clump Strength (gram) | Cat Acceptability | Masking cat urine odor (ammonia) |
|---|---|---|---|
| 63.1 ± 2.5 | 410.5 ± 90.0 | No objection | Excellent |

Example 16

This example illustrates the effect of particles size on the properties of the animal litter. Coarsely ground citrus peel/pulp residue did not clump quickly enough in the following formulations, which were deemed unsatisfactory.

TABLE 16.1

| | Formulation | |
|---|---|---|
| Ground Corn Meal (Jacobson Hammer Mill with 1/4" screen) | 66.5 | 56.5 |
| Cattle-feed citrus peel pellet ground through 1/8" screen | 20 | 30 |
| Starch | 10 | 10 |
| Citric Acid | 1.5 | 1.5 |
| Salt | 2 | 2 |
| Test | | |
| Clump Weight | ND, Ran through | ND, Ran through |

Ground citrus pellets "A" and "B" (as set forth in Table 7.2) were used to prepare the following litters, the first of which was deemed unsatisfactory and the second of which was deemed satisfactory.

TABLE 16.2

| | Formulation | |
|---|---|---|
| Ground Corn Meal (Jacobson Hammer Mill with 1/4" screen) | 66.5 | 66.5 |
| Ground citrus peel pellet "B" | 20 | |
| Ground citrus peel pellet "A" | | 20 |
| Starch | 10 | 10 |
| Citric Acid | 1.5 | 1.5 |
| Salt | 2 | 2 |
| Test | | |
| Clump Weight | ND, Ran through | 66.9 |

Example 17

Virgin corn germ was incorporated into the litter formulations described in Table 16.2. The virgin germ was coarsely ground though an Alpine Mill and formulated into a litter in the same manner as in the previous Example.

TABLE 17

|  | Formulation | | |
| --- | --- | --- | --- |
| Ground Corn Meal (Jacobson Hammer Mill with ¼" screen) | 66.5 | 66.5 | 66.5 |
| Ground Citrus Peel pellet "A" | 20 | 20 | 30 |
| Starch | 10 | 10 | 10 |
| Ground "virgin" germ |  | 5 | 5 |
| Citric Acid | 1.5 | 1.5 | 1.5 |
| Salt | 2 | 2 | 2 |
| Test | | | |
| Clump Weight | 66.9 | 63.2 | 63.1 |
| Clump Strength |  | 442.5 | 309.9 |
| Ammonia-masking | Good | Good | Good |

The figures in columns 2 and 3 of Table 17 are expressed on a parts by weight basis. It is seen that the virgin germ lowers the clumps weight of the litter relative to a similar formulation prepared in the absence of the germ.

Example 18

Litters were prepared with corn bran, citrus peel, and corn meal. The following litters were prepared.

TABLE 18

|  | Formulation | | | |
| --- | --- | --- | --- | --- |
| Ground Corn Meal (Jacobson Hammer Mill with ¼" screen | 66.5 | 56.5 | 51.5 | 46.5 |
| Ground citrus peel pellet "A" | 20 | 20 | 20 | 20 |
| Corn Bran | 10 | 10 | 15 | 20 |
| Starch |  | 10 | 10 | 10 |
| Citric Acid | 1.5 | 1.5 | 1.5 | 1.5 |
| Salt | 2 | 2 | 2 | 2 |
| Test | | | | |
| 5-min Clump Weight (g) | 66.9 | Ran through | 66.7 | 65.4 |
| Clump Strength (g) |  |  | 556.7 | 713.2 |
| Ammonia-masking | good | good | good | Good |

Example 19

The following litter formulations were prepared and deemed highly preferred.

TABLE 19.1

|  | Formulation | |
| --- | --- | --- |
| Ground Corn Meal (Jacobson Hammer Mill with ¼" screen) | 56.5 | 56.5 |
| Ground citrus peel pellet "A" | 10 | 15 |
| Corn Bran | 15 | 10 |
| Starch | 10 | 10 |
| Ground "virgin" germ | 5 | 5 |
| Citric Acid | 1.5 | 1.5 |
| Salt | 2 | 2 |
| Test | | |
| 5-min. Clump Weight (g) | 61.6 | 62 |
| Clump Strength (g) | 900.7 | 542 |
| Ammonia-masking | Excellent | Excellent |

Upon scale-up on production-scale pelleting mills, the following formulations were prepared and evaluated.

TABLE 19.2

|  | Percentage based on total weight (as-is) | | |
| --- | --- | --- | --- |
| Ingredients | 19-A | 19-B | 19-C |
| Ground Cattle-feed Orange peel Pellets (1/16" screen) | 20 | 10 | 10 |
| Ground whole corn meal |  | 56.5 | 31.5 |
| DCM-120 defatted corn germ meal | 62.5 |  | 25 |
| Starch | 14 | 10 | 10 |
| Ground "virgin" germ |  | 5 | 5 |
| Corn bran (Ultra-fine: NU20085) |  | 15 | 15 |
| Citric Acid | 1.5 | 1.5 | 1.5 |
| Salt | 2 | 2 | 2 |
| Test | | | |
| Average 5-min Clump Wt. (g)* | 66.0 | 63.5 | 62.5 |
| Clump Strength (gram)* | 479 | 487.7 | 734 |
| Masking cat urine order | Excellent | Excellent | Excellent |

*Average, n = 4

Example 20

This example illustrates that pelleting temperature can affect the properties of the resulting litter. The ingredients listed in Tables 20 were pelletized under the conditions shown. Clump weight was determined and is also reported.

TABLE 20

|  | Percentage based on total weight (as is) | | | |
| --- | --- | --- | --- | --- |
| Ingredients | 20-A | 20-B | 20-C | 20-D |
| Ground Cattle-Feed Citrus Peel Pellets (1/16" screen) | 20 | 20 | 20 | 20 |
| Ground whole corn meal | 66.4 | 66.4 |  |  |
| DCM-120 defatted corn germ meal |  |  | 66.4 | 66.4 |
| Starch | 10 | 10 | 10 | 10 |
| Ground "virgin" germ |  |  |  |  |
| Citric acid | 1.5 | 1.5 | 1.5 | 1.5 |
| Salt | 2 | 2 | 2 | 2 |
| Potassium Sorbate | 0.1 | 0.1 | 0.1 | 0.1 |
| Moisture | As-is | As-is | As-is | As-is |
| Pelleting Temperature (° F.) | 175 | 160 | 175 | 160 |
| Test | | | | |
| Average 5-min Clump Wt. (g)* | 68.3 | 64.6 | Ran through | 64.3 |
| Masking cat urine odor | Excellent | Excellent | Excellent | Excellent |

Example 21

The formulations set forth in Table 21 were pelletized at the temperatures set forth in Table 21 yielding litters having the clump strength and weight also shown.

TABLE 21

|  | Percentage based on total weight (as is) | |
| --- | --- | --- |
| Ingredients | 21-A | 21-B |
| Ground Cattle-feed Orange Peel Pellets (1/16" screen) | 20 | 20 |
| Starch | 10 | 15 |
| Ground Corn (3/16") | 46.4 | 46.4 |

TABLE 21-continued

| Ingredients | Percentage based on total weight (as is) | |
|---|---|---|
| | 21-A | 21-B |
| Ground 75:25 blend of DCM-120 and "virgin" germ | 20 (15% DCM-120 + 5% "virgin" germ) | 15 (11.25% DCM-120 + 3.75% "virgin" germ) |
| Citric Acid | 1.5 | 1.5 |
| Salt | 2 | 2 |
| Potassium Sorbate | 0.1 | 0.1 |
| Moisture | As-is | As-is |
| Pelleting Temperature (° F.) | 165 | 165–170 |
| Test | | |
| Average 5-min Clump Wt. (g)* | 60.4 | 63.8 |
| Clump Strength (gram)* | 375 | 456 |
| Masking cat urine odor | Excellent | Excellent |

Adding 3.75% ground vs. 5% and changes in starch % changed clump weight and clump strength.

Example 22

The following litter was prepared.

TABLE 22

| Ingredients | Percentage based on total weight (as-is) % |
|---|---|
| Ground Cattle-feed Orange peel Pellets (1/16" screen) | 20 |
| Starch | 15 |
| Ground Corn (3/16") | 46.9 |
| Ground 75:25 blend of DCM 120 and "virgin" germ | 15 (11.25% DCM-120 + 3.75% "virgin" germ) |
| Citric acid | 1 |
| Salt | 2 |
| Potassium Sorbate | 0.1 |
| Moisture | As-is |
| Pelleting Temperature (° F.) | 165 |
| Clump weight (g)* | 61.4 ± 2.0 |
| Masking cat urine odor | Excellent |

*Average, n = 4

Example 23

The following litter was prepared.

TABLE 23

| Ingredients | Percentage based on total weight (as-is) |
|---|---|
| Ground Corn whole (3/16" screen on hammer mill) | 41.9 |
| Starch | 10 |
| Defatted corn germ meal (DCM-120) | 25 |
| Fine-ground Corn Bran | 15 |
| Ground "virgin" germ | 5 |
| Citric acid | 1 |
| Salt | 2 |
| Potassium Sorbate | 0.1 |
| Moisture | As-is |
| Test | |
| Average 5-min Clump Wt. (g)* | 58.4 ± 8.6 |
| Masking cat urine odor | Excellent |

*Average, n > 10

Example 24

The following litter was prepared.

TABLE 24

| Ingredients | Percentage based on total weight (as-is) |
|---|---|
| Ground Corn whole (3/16" screen on hammer mill) | 31.85 |
| Starch | 12 |
| Defatted corn germ meal (DCM-120) | 26.25 |
| Ground Citrus peel/pulp pellets | 23 |
| Ground "virgin germ | 3.75 |
| Citric acid | 1 |
| Salt | 2 |
| Potassium Sorbate | 0.15 |
| Moisture | As-is |

It is thus seen that animal litters, processes for preparing animal litters, and methods for removal of animal waste are provided.

All references, including without limitation publications, prior patent applications, and patents, cited herein are hereby incorporated by reference. All methods described herein can be performed in any suitable order unless otherwise indicated herein or otherwise clearly contradicted by context. The use of any and all examples or exemplary language provided herein is intended merely to better illuminate the invention and does not pose a limitation on the scope of the invention unless otherwise claimed. No language in the specification should be construed as indicating any non-claimed element as essential to the practice of the invention. In describing an ingredient or component, the term "an amount effective" for a given purpose and like terms should be not construed as excluding greater amounts of such ingredient or component. No product claim not explicitly using the term "process" or "method" or depending from a claim that uses one of these terms should be construed as a product by-process claim. Except where moisture content is specified, weight percents, parts by weight, or fractions set forth herein are expressed on a dry solids basis. Preferred embodiments of this invention are described herein. Variations of those preferred embodiments may become apparent upon reading the foregoing description. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. An animal litter comprising;
   ground whole corn;
   a first sorbent, said first sorbent comprising spent corn germ;
   a discrete second sorbent, said second sorbent comprising a citrus residue;
   said first sorbent being present in said litter in an amount relatively greater than said second sorbent
   a cohesiveness agent, said cohesiveness agent comprising a starch;
   a supplemental cohesiveness agent;
   said animal litter being in the form of discrete plural compacted particles which tend to agglomerate when wetted,
   said cohesiveness agent being present in said litter in an amount effective to enhance the intraparticle cohesion of said particles.

2. An animal liner according to claim 1, said second sorbent comprising a citrus peel residue.

3. An animal litter according to claim 1, said citrus peel residue comprising a citrus pellet residue.

4. An animal litter according to claim 1, said citrus peel residue comprising a pectin peel residue.

5. A process for preparing an animal litter, comprising compacting a mixture of ingredients into discrete plural compacted particles which tend to agglomerate when wetted, said mixture of ingredients comprising:
- ground whole corn;
- a first sorbent, said first sorbent comprising spent corn germ;
- a discrete second sorbent, said second sorbent comprising a citrus residue;
- said first sorbent being present in said litter in an amount relatively greater than said second sorbent
- a cohesiveness agent, said cohesiveness agent comprising a starch;
- a supplemental cohesiveness agent;
- said animal litter being in the form of discrete plural compacted particles which tend to agglomerate when wetted,
- said cohesiveness agent being present in said litter in an amount effective to enhance the intraparticle cohesion of said particles.

6. A method according to claim 5, said second sorbent comprising a citrus peel residue.

7. A method according to claim 5, said citrus peel residue comprising a citrus pellet residue.

8. A method according to claim 5, said citrus peel residue comprising a pectin peel residue.

9. A method for removal of animal waste, comprising:
providing a container including an animal litter, said animal litter comprising:
- ground whole corn;
- a first sorbent, said first sorbent comprising spent corn germ;
- a discrete second sorbent, said second sorbent comprising a citrus residue;
- said first sorbent being present in said litter in an amount relatively greater than said second sorbent
- a cohesiveness agent, said cohesiveness agent comprising a starch;
- a supplemental cohesiveness agent;
- said animal litter being in the form of discrete plural compacted particles which tend to agglomerate when wetted,
- said cohesiveness agent being present in said litter in an amount effective to enhance the intraparticle cohesion of said particles,
allowing an animal to excrete waste into said litter, whereby liquid present in said container as a result of said waste causes at least a portion of said litter to agglomerate into at least one clump; and
removing said clump from said container.

10. A method according to claim 9, said second sorbent comprising a citrus peel residue.

11. A method according to claim 9, said citrus peel residue comprising a citrus pellet residue.

12. A method according to claim 9, said citrus peel residue comprising a pectin peel residue.

* * * * *

UNITED STATES PATENT AND TRADEMARK OFFICE
CERTIFICATE OF CORRECTION

PATENT NO. : 7,753,002 B2
APPLICATION NO. : 11/615206
DATED : July 12, 2010
INVENTOR(S) : Lin Wang and Thomas A. Wiesner Page 1 of 1

It is certified that error appears in the above-identified patent and that said Letters Patent is hereby corrected as shown below:

In Column 30, Line 66 - delete "liner", insert --litter--

Signed and Sealed this

Seventh Day of December, 2010

David J. Kappos
*Director of the United States Patent and Trademark Office*